United States Patent
Nowak et al.

(10) Patent No.: US 12,304,185 B2
(45) Date of Patent: *May 20, 2025

(54) REPULPABLE, RECYCLABLE, COMPOSTABLE AND BIODEGRADABLE REINFORCEMENT ELEMENTS AND PAPER REINFORCED TAPES, AND CONTAINERS INCLUDING THE SAME

(71) Applicant: H.B. Fuller Company, St. Paul, MN (US)

(72) Inventors: Michael J. Nowak, Vadnais Heights, MN (US); Cynthia A. Stewart-Irvin, Vancouver, WA (US); Patrick D. Gleason, Shoreview, MN (US)

(73) Assignee: H.B. Fuller Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,425

(22) Filed: Oct. 19, 2023

(65) Prior Publication Data
US 2024/0042747 A1 Feb. 8, 2024

Related U.S. Application Data

(63) Continuation of application No. 17/143,588, filed on Jan. 7, 2021, now Pat. No. 11,826,995.
(Continued)

(51) Int. Cl.
*B32B 29/00* (2006.01)
*B31B 50/62* (2017.01)
(Continued)

(52) U.S. Cl.
CPC ............ *B32B 29/005* (2013.01); *B31B 50/62* (2017.08); *B32B 7/12* (2013.01); *B32B 29/02* (2013.01);
(Continued)

(58) Field of Classification Search
CPC ......... B32B 29/005; B32B 7/12; B32B 29/02; B32B 7/03; B32B 2250/26;
(Continued)

(56) References Cited

U.S. PATENT DOCUMENTS

| 5,135,790 A | 8/1992 | Kaplan et al. |
| 5,624,751 A | 4/1997 | Spies et al. |

(Continued)

FOREIGN PATENT DOCUMENTS

DE 102015001555 A1 * 8/2016 ............. C09J 7/201

OTHER PUBLICATIONS

Machine Translation of DE-102015001555-A1 (Year: 2016).*

*Primary Examiner* — Patricia L. Nordmeyer
(74) *Attorney, Agent, or Firm* — Kristi Halloran; Kirsten Stone

(57) ABSTRACT

The paper reinforced tapes and reinforcement elements of this invention have improved repulpability, recyclability, compostability and biodegradability. Further, these reinforcement elements and paper reinforced tapes, despite being predominately paper, unexpectedly provide excellent container reinforcement properties and further can be used as opening tapes, closing tapes, tear tapes and carrying handles.

20 Claims, 8 Drawing Sheets

Related U.S. Application Data

(60) Provisional application No. 63/044,599, filed on Jun. 26, 2020, provisional application No. 62/979,236, filed on Feb. 20, 2020, provisional application No. 62/958,108, filed on Jan. 7, 2020.

(51) Int. Cl.
| | |
|---|---|
| *B32B 7/12* | (2006.01) |
| *B32B 29/02* | (2006.01) |
| *B65D 5/46* | (2006.01) |
| *B65D 5/54* | (2006.01) |
| *B65D 75/52* | (2006.01) |
| *C09J 7/21* | (2018.01) |
| *C09J 7/29* | (2018.01) |
| *C09J 7/35* | (2018.01) |
| *C09J 7/38* | (2018.01) |
| *C09J 7/40* | (2018.01) |
| *C09J 167/04* | (2006.01) |
| *C09J 189/00* | (2006.01) |
| *D21H 25/00* | (2006.01) |
| *D21H 27/10* | (2006.01) |
| *C09J 5/06* | (2006.01) |

(52) U.S. Cl.
CPC .......... *B65D 5/46016* (2013.01); *B65D 5/54* (2013.01); *B65D 75/52* (2013.01); *C09J 7/21* (2018.01); *C09J 7/29* (2018.01); *C09J 7/35* (2018.01); *C09J 7/38* (2018.01); *C09J 7/403* (2018.01); *C09J 167/04* (2013.01); *C09J 189/00* (2013.01); *D21H 25/005* (2013.01); *D21H 27/10* (2013.01); *C09J 5/06* (2013.01); *C09J 2301/124* (2020.08); *C09J 2400/263* (2013.01); *C09J 2400/283* (2013.01); *C09J 2431/00* (2013.01); *C09J 2467/006* (2013.01); *C09J 2489/006* (2013.01); *Y10T 428/14* (2015.01)

(58) Field of Classification Search
CPC .......... B32B 2250/40; B32B 2255/12; B32B 2255/26; B32B 2264/1021; B32B 2307/718; B32B 2307/732; B32B 2405/00; B32B 7/06; B32B 3/266; B31B 50/62; B65D 5/46016; B65D 5/54; B65D 75/52; B65D 63/1009; C09J 7/21; C09J 7/29; C09J 7/35; C09J 7/38; C09J 7/403; C09J 167/04; C09J 189/00; C09J 5/06; C09J 2301/124; C09J 2400/263; C09J 2400/283; C09J 2431/00; C09J 2467/006; C09J 2489/006; D21H 25/005; D21H 27/10; D21H 27/30; D21H 27/32; D21H 27/38; Y10T 428/14; Y02W 30/80; Y02W 90/10

See application file for complete search history.

(56) References Cited

U.S. PATENT DOCUMENTS

| | | | |
|---|---|---|---|
| 11,826,995 B2* | 11/2023 | Nowak | .................. D21H 27/32 |
| 2003/0235687 A1 | 12/2003 | Peacock | |
| 2005/0186417 A1 | 8/2005 | Rodriguez | |
| 2007/0068641 A1 | 3/2007 | Dever et al. | |
| 2012/0298734 A1* | 11/2012 | Bradshaw | .................. C09J 7/21 |
| | | | 156/60 |

* cited by examiner

REPULPABLE, RECYCLABLE, COMPOSTABLE AND BIODEGRADABLE REINFORCEMENT ELEMENTS AND PAPER REINFORCED TAPES, AND CONTAINERS INCLUDING THE SAME

This Application is a Continuation of U.S. application Ser. No. 17/143,588 filed Jan. 7, 2021 which claims the benefit of U.S. Provisional Patent Application No.: 63/044,599 filed on Jun. 26, 2020, U.S. Provisional Patent Application No.: 62/979,236 filed on Feb. 20, 2020, and U.S. Provisional Application No.: 62/958,108 filed Jan. 7, 2020, which are incorporated herein.

BACKGROUND

Various tapes (reinforcing tapes, closing tapes, opening tapes (e.g., tear tapes), etc.) that include an adhesive composition and are currently used in the corrugated and folding carton industries do not completely break down in the processes employed for recycling the corrugated or folding cartons.

The tapes often include a plastic film as a backing layer and reinforcement elements such as, for example, plastic strings and plastic films that do not break down. These plastic films and strings are currently removed during paper repulping by a ragger chain or by screens and filters and then enter the waste stream to be land filled or burned. If these removal processes fail, the string or film can decrease the efficiency of the repulping process.

The current tapes are also not completely recyclable, compostable or biodegradable.

It would be desirable if the entire tape or more of the tape could be comprised of components that could be broken down in the repulping process. It would further be desirable if the entire tape or more of the tape could be recyclable, compostable or even biodegradable.

SUMMARY

In one aspect, the invention features a container comprising a reinforcement element secured to a portion
 of the container, wherein the reinforcement element comprises a continuous paper strip having a first and second side and a first layer of adhesive composition disposed on at least one of the first and second side, wherein the reinforcement element is secured to the container through the adhesive composition. In one embodiment, the invention features a container selected from the group consisting of a first container comprising, a substrate having a first layer and a second layer; and a reinforcement element secured to at least the first layer or the second layer such that the reinforcement element is located between the first layer and the second layer; and a second container comprising, a substrate having at least one exterior surface; and a reinforcement element secured to at least one exterior surface of the substrate; wherein the reinforcement element comprises a continuous paper strip having a first and second side and a first layer of adhesive composition disposed on at least one of the first and second sides.

In one embodiment, the substrate is selected from the group consisting of paper, paper board, and non paper. In another embodiment, the reinforcement element is free from plastic film derived from fossil fuel based materials and plastic string derived from fossil fuel based materials. In a different embodiment, the reinforcement element is completely naturally sourced. In one embodiment, the continuous paper strip comprises paper having a basis weight of from 60 to 200 grams/square meter. In another embodiment, the continuous paper strip has a width of from 1 mm to 50 mm.

In one embodiment, the adhesive composition is selected from the group consisting of hot melt adhesive composition and protein adhesive composition. In a different embodiment, the adhesive composition is selected from the group consisting of water soluble and water dispersible. In another embodiment, the continuous paper strip comprises the first layer of adhesive composition disposed on the first side and a second layer of material disposed on the second side.

In another embodiment, the first layer of adhesive composition and the second layer of material are the same. In a different embodiment, the second layer of material is a release material. In one embodiment, the release material is selected from the group consisting of polyethylene, polypropylene, silicone, higher bio-content and renewable versions thereof and combinations thereof. In still another embodiment, the release material is pre-coated onto the second side of the continuous paper strip.

In one embodiment, the reinforcement element further includes a continuous fibrous substrate. In another embodiment, the continuous fibrous substrate is naturally sourced. In a different embodiment, the reinforcement element further includes a design element selected from the group consisting of perforation, slitting, folding and combinations thereof.

In another embodiment, the reinforcement element passes Part I of the Fibre Box Association Test Method. In still another embodiment, the reinforcement element passes Part I of the Fibre Box Association Test and Modified Fibre Box Association Test Part II. In one embodiment, the reinforcement element is a tear tape.

This invention features reinforcement elements and paper reinforced tapes that have improved repulpability, recyclability, compostability and biodegradability. These reinforcement elements and paper reinforced tapes, despite being predominately paper, unexpectedly provide excellent container reinforcement properties. Further, the reinforcement elements and paper reinforced tapes are sturdy enough to enable application at high speed. For example, Applicants have found that a paper reinforced tape can be applied to a carton at a speed of 10,000 cartons/hour without any tearing issues.

BRIEF DESCRIPTION OF THE DRAWINGS

The drawings are intended to be illustrative and are not limiting.

DEFINITIONS

Figure 1:
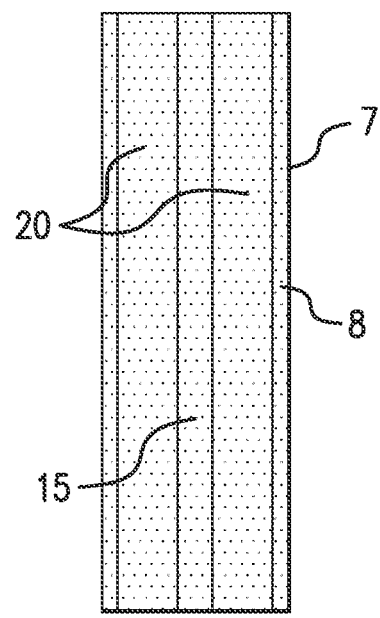
FIG. 1 is a top view of a paper reinforced tape of the invention including two separate continuous paper strips.

Repulpable or repulpability refers to the ability of a material to break down sufficiently in a repulper such that the paper fibers can be separated from the other materials.

Recyclable or Recyclability refers to the ability of the material to be reused in for example new paper.

Biodegradable or Biodegradability refers to the ability of a material to be decomposed by bacteria or another living organism.

Compostable or Compostability refers to a component of the hot melt adhesive composition that passes ASTM D 6400.

Tape refers to a substrate having a flat or rectangular cross-section ranging in width from 0.5 millimeters (mm) to 3700 mm (or the width of the web).

Naturally sourced (or bio-based) refers to a material that occurs naturally in the environment and is not derived for example from fossil fuel based materials. This further includes laboratory generated materials designed to be similar to naturally sourced materials and naturally sourced materials that are modified in some way prior to use.

DETAILED DESCRIPTION

In the reinforcement elements and paper reinforced tapes of this invention, a continuous strip of paper is used to reinforce paperboard containers by adding strength to stress points. The reinforcement elements and paper reinforced tapes can also be used as closing tapes, opening tapes (e.g. tear tapes) and as a carrying handle.

The reinforcement elements and paper reinforced tapes of this invention can be free of both plastic string and plastic film derived from fossil fuel based materials. This improves the ease of the repulping process as the step of removing these materials is no longer needed. It further prevents the waste associated with the plastic string and film.

The reinforcement elements and paper reinforced tapes of this invention can be wound into large rolls for use at a later date.

In the reinforcement elements and paper reinforced tapes of this invention more of the available fiber of the reinforcement element or paper reinforced tape is capable of becoming a component of a repulped paper product. In an embodiment, at least 5% by weight, at least 10% by weight, at least 20% by weight, at least 50% by weight, at least 80% by weight, at least 90% by weight, from 10% by weight to 100% by weight, from 50% by weight to 100%, from 80% by weight to 100% by weight, or even 100% by weight of the reinforcement element or paper reinforced tape is capable of becoming a component of a repulped paper product.

The reinforcement elements and paper reinforced tapes of this invention can be completely naturally sourced. The reinforcement element and paper reinforced tapes of this invention can further be compostable or biodegradable.

In a preferred embodiment, the reinforcement elements and paper reinforced tapes of this invention pass the Fibre Box Association Test Part I, or even Part I and the Modified Fibre Box Association Test Part II.

Reinforcement Element

The invention features a reinforcement element including a continuous paper strip having a first side and a second side and a layer of adhesive composition disposed on at least one of the first side and second side.

Figure 2:
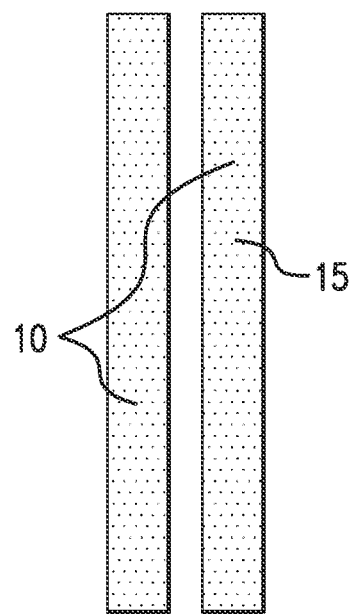
FIG. 2 is a top view of two separate reinforcement elements without a backing layer.

FIG. 2 is an example of two separate reinforcement elements (10) including a layer of adhesive composition (15, dot pattern).

The reinforcement element can vary in width. It can be as wide as the web on which it is coated. The reinforcement element can then be cut into smaller widths. It can be from 0.5 mm to 3700 mm, from 2 mm to 500 mm, from 2 mm to 100 mm wide, or even from 2 mm to 25 mm wide. The reinforcement element can be 1 mm to 50 mm wide, 1 mm to 30 mm wide, 5 mm to 30 mm wide, or even from 8 mm to 25 mm wide.

The reinforcement element can be 0.5 mils to 50 mils thick, 2 mils to 30 mils thick, or even 5 mils to 20 mils thick.

The continuous paper strip of the reinforcement element can be incorporated into a paper reinforced tape. Alternatively, the reinforcement element can be used as a closing tape, an opening tape (e.g tear tape), a handle or to reinforce any portion of a paperboard container.

Continuous Paper Strip

The reinforcement elements and paper reinforced tapes of this invention include a continuous paper strip. The continuous paper strip is repulpable, recyclable and is naturally sourced.

The paper used for the continuous paper strip is not particularly limited. The paper can include cellulose (e.g. wood, cotton, bamboo, jute, hemp, thistle, linen, abaca, etc.), vegetables, other naturally derived materials or a combination thereof.

The paper can further include other materials such as e.g. fillers (e.g. calcium carbonate, clay, etc.), wet strength resins (e.g. urea-formaldehyde, melamine-formaldehyde, polyamide-epichlorohydrin) and dry strength resins (e.g. starches, natural gums (guar, locast bean, etc.), cationic polyacrylamides, etc.)

Suitable papers for the continuous paper strip include those having a basis weight of from about 25 grams per square meter (gsm) (about 16 #paper), 50, 75, or 100 gsm, to 150, 250, or 300 gsm, or a weight between any pair of the foregoing values.

Papers having a higher basis weight of from 60 to 200 gsm, 70 to 200 gsm, or even 100 to 300 gsm are found to provide preferred reinforcement properties, but lower basis weight materials can also have a reinforcing effect.

The paper strip can be from 0.5 mm to 3700 mm, from 2 mm to 500 mm, from 2 mm to 100 mm wide, from 2 mm to 25 mm wide, from 2 mm to 20 mm wide, or even from 3 mm to 15 mm wide.

Suitable papers for the continuous paper strip include ADVANTAGE MF SPRING PACK PLUS 160 and 70 available from The Mondi Group (Atlanta, GA), SPRING FORMULA 140 and 155 available from Stora Enso (Helsinki, Finland) and FIBRE FORM white 3d paper in basis weights of 80 to 200 gsm available from Billerudkorsnas AB (Solna, Sweden).

Adhesive Composition

The reinforcement elements and paper reinforced tapes of this invention include at least one adhesive composition. The reinforcement elements and paper reinforced tapes can include more than one adhesive composition. The adhesive composition can be formed into one or more layers. For example, the continuous paper strip can include a first adhesive layer on the first side and a second adhesive layer on the second side. The first adhesive layer can be formed from the same adhesive composition that forms the second adhesive layer. The first adhesive layer can alternatively be formed from an adhesive composition that is different than the second adhesive layer.

The reinforcement element can include an adhesive composition that bonds the reinforcement element to a continuous backing layer (e.g. if the reinforcement element is used in a paper reinforced tape). Additionally, or alternatively, the reinforcement element may include an adhesive composition that is suitable for bonding the reinforcement element to a surface of a substrate e.g. a paper board container.

The adhesive composition can be selected from the group consisting of hot melt adhesive composition, water based adhesive composition (e.g. starch based adhesive (e.g. starch esters (e.g. starch propionates, starch acetates, etc.)), dextrin based adhesive, protein adhesive, etc.), solvent based adhesive composition, reactive adhesive composition and a combination thereof. The adhesive composition can be a pressure sensitive adhesive composition or a non-pressure sensitive adhesive composition (e.g. re-activated with heat, moisture or other stimulus to bond to the surface of a substrate).

In one embodiment, the adhesive composition is selected from a group consisting of water soluble and water dispersible adhesive compositions (e.g. protein adhesive composition (also known as animal glue or technical gelatin), poly lactic acid (PLA) based adhesive, etc.). The type of water soluble/water dispersible adhesive composition is not intended to be limited but rather could encompass any number of adhesives as long as the adhesive is able to be dissolved or dispersed in the repulping process.

Regardless of the type of adhesive composition chosen, the adhesive composition needs to securely adhere the reinforcement element to the container being reinforced, closed or opened and/or to the paper reinforced tape.

The adhesive composition can be a hot melt adhesive composition. The hot melt adhesive composition can be selected from any number of hot melt adhesive compositions including hot melt pressure sensitive adhesives, non-pressure sensitive hot melt adhesives, remoistenable hot melt adhesives, water dispersible/water soluble hot melt adhesives, water insoluble hot melt adhesives, compostable hot melt adhesives, reactive hot melt adhesives and biodegradable hot melt adhesives.

Typical hot melt adhesive compositions include those based on a variety of different thermoplastic polymers including, e.g., homopolymers, copolymers, terpolymers, and higher order thermoplastic polymers.

Suitable classes of thermoplastic polymers include, e.g., olefin polymer (e.g. olefin homopolymers, copolymers and higher order polymers (e.g., ethylene vinyl acetate, polyolefins (e.g., polyethylene, polypropylene, metallocene-catalyzed polyolefins, and combinations thereof)), and combinations thereof; acrylates (e.g., alkyl acrylates and methacrylates (e.g., ethyl acrylate, ethyl methacrylate, ethyl n-butyl acrylate, butyl acrylate, butyl methacrylate, and combinations thereof)); elastomers (e.g., elastomeric block copolymers (e.g., styrene-butadiene-styrene, styrene-isoprene-styrene, styrene-ethylene/butylene-styrene, and styrene-ethylene/propylene-styrene), elastomeric polyolefins, and combinations thereof); thermoplastic polyesters (e.g. poly lactic acid (PLA) based polymers, polyhydroxyalkanoate (PHA) based polymers, polycaprolactone, etc.); thermoplastic polyamides; thermoplastic polyurethanes; graft copolymers of polyvinyl acetate (or polyacrylates) and polyethylene glycol; polyvinyl pyrrolidone or vinyl acetate copolymers; and combinations thereof.

Useful adhesive compositions include 80-80, a protein adhesive composition available from Wisdom Adhesives (now H. B. Fuller Company), GREENMELT from Avebe (The Netherlands) and BL22515, an ethylene vinyl-acetate based hot melt adhesive composition available from H. B. Fuller Company (Vancouver, Washington).

Methods for applying the adhesive composition include, for example, immersion coating, flood coating, gravure printing, slot coating, laminating, roll coating, foaming, intermittent stitch pattern, bead from nozzle application and spray coating. In a preferred embodiment, the adhesive is applied in a discontinuous pattern.

The adhesive composition is disposed on at least one side of the continuous paper strip. The adhesive composition can be present in a layer of from 6.35 microns (0.25 mils) to 254 microns (10 mils), from 12.7 microns (0.50 mils) to 152.4 microns (6 mils), or even from 12.7 microns (0.50 mils) to 101.6 microns (4 mils).

Reinforcement Element as a Tear Tape

The reinforcement element can be a tear tape, including a wet end tear tape (e.g. tape applied at the wet end of the corrugator process). A tear tape is a tape adhered to an interior surface of a sealed container (e.g. envelope, bag, mailer, carton, etc.). It can be adhered between layers of a substrate or on the outer layer of a substrate. When the user wishes to open the container, an exposed end of the tape is pulled, which tears through the packaging, enabling it to open. The packaging can comprise a variety of substrates including e.g. paper, paperboard, non-paper (e.g. Tyvek®), etc.

The tear tape includes a continuous paper strip having a first side and a second side and a layer of adhesive composition disposed on the first side. The reinforcement element can additionally include a layer of release material disposed on the second side to enable the tear tape to be wound into a roll. This is helpful if the adhesive has residual tack. The release material can be selected from the group consisting of a layer of release coating applied to the second side of the continuous paper strip, a plastic film with release properties applied to the second side, a separate layer of release material affixed to the top of the adhesive composition, and a combination thereof.

Figure 17:
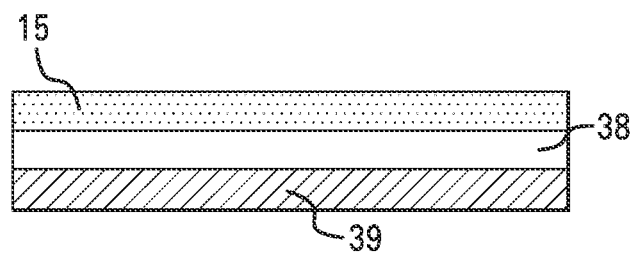
FIG. 17 is a side view of a reinforcement element as a tear tape.

FIG. 17 is an example of a reinforcement element as a tear tape including a layer of adhesive composition (15, dot pattern) applied to the first side of the continuous paper strip (38) and a layer of release coating (39) applied to the second side of the continuous paper strip.

The continuous paper strip can be selected from a variety of papers include those listed above in the continuous paper strip section. The continuous paper strip can have a basis weight of from 50 gsm to 250 gsm, or even from 60 gsm to 200 gsm. The continuous paper strip can have a width of from 2 mm to 10 mm, or even from 3 mm to 8 mm.

Suitable papers for the continuous paper strip include ADVANTAGE MF SPRING PACK PLUS 160 gsm and 70 gsm available from The Mondi Group (Atlanta, GA), SPRING FORMULA 140 and 155 available from Stora Enso (Helsinki, Finland) and FIBRE FORM white 3d paper in basis weights of 80 to 200 gsm available from Biller-udkorsnas AB (Solna, Sweden).

The adhesive composition can be selected from a variety of adhesive compositions including those listed above in the adhesive section. In one embodiment, the adhesive composition is a pressure sensitive adhesive composition selected from the group consisting of styrene block copolymer based and acrylic based pressure sensitive adhesive compositions. The layer of adhesive composition can have a thickness of from 0.5 mils to 5 mils, or even 1 mil to 4 mils.

The release coating can be pre-coated onto the second side of the continuous paper strip by the paper supplier or applied in line. The release coating can be selected from a group consisting of silicone, polyethylene, polypropylene, higher bio-content and renewable versions thereof and combinations thereof. Alternatively, the release coating can be a hot melt adhesive composition or any other material that provides release properties when the tear tape is wound into a roll. The release coating can further include additional layers of materials between the release coating and the continuous paper strip to improve adhesion of the release material to the continuous paper strip including e.g. polyethylene terephalate Paper Reinforced Tape The paper reinforced tape includes a continuous paper strip, a continuous paper backing layer, and a first layer of adhesive composition disposed between the continuous paper strip and the continuous paper backing layer, thereby adhering the continuous paper strip to the continuous paper backing layer.

The continuous paper strip and the continuous paper backing layer can be different in some way.

The continuous paper strip and the continuous paper backing layer can have different widths, different basis weights, include different fibers, have different fiber orientations, or be different in any other possible way.

Alternatively, the continuous paper strip and the continuous paper backing layer can both have a basis weight of greater than 100 gsm. The adhesive composition can be selected from the group consisting of water dispersible and water soluble.

The first layer of adhesive composition can be applied to the continuous paper backing layer and/or the continuous paper strip and then the two brought together form a bond.

The paper reinforced tape can be used in applications selected from the group consisting of a reinforcement tape, a closing tape, an opening (e.g. tear tape) and a carrying handle.

The placement of the continuous paper strip on the continuous paper backing layer is not particularly limited. In a preferred embodiment, the continuous paper strip is applied such that it is substantially parallel to the continuous paper backing layer.

The paper reinforced tape can be configured in a variety of ways. The continuous paper strip can be present as one wide strip. Alternatively, the paper reinforced tape can include from 1 to 50, 1 to 20, 1 to 10, 2 to 10, or even 1 to 5 continuous paper strips of various thicknesses (or the same thickness) across the width of the paper reinforced tape. The continuous paper strip can have a width less than the width of the continuous paper backing layer.

FIG. 1 shows an example of a paper reinforced tape (7) with 2 continuous paper strips (20) on a continuous paper backing layer (8) coated with a layer of adhesive composition (15, dot pattern).

The continuous paper backing layer and the continuous paper strip can be arranged such that the orientation of the paper fibers of the two materials are in different directions. In one embodiment, the machine direction of fibers of the continuous paper strip is aligned longitudinally to the paper reinforced tape length.

A first layer of adhesive composition can be applied to the first side of the continuous paper backing layer and the continuous paper strip/s adhered to it. A second layer of adhesive composition can optionally be applied over the top of the adhered continuous paper strip/s. A third layer of adhesive composition can optionally be applied to the second side (or back side) of the continuous paper backing layer.

If more than one layer of adhesive composition is used in the paper reinforced tape, the layers can be formed of the same adhesive composition, or different adhesive compositions using the same adhesive pattern or different adhesive patterns. Useful adhesive compositions are the same as those used in the reinforcement element and can be found in the Adhesive section above.

In one embodiment, the paper reinforced tape can include a continuous paper strip, a continuous paper backing layer, and a first layer of adhesive composition disposed between the continuous paper strip and the first side of the continuous paper backing layer, thereby adhering the continuous paper strip to the first side of the continuous paper backing layer, the first layer of adhesive composition being selected from the group consisting of water dispersible and water soluble. The paper reinforced tape can further include a second layer of adhesive composition selected from the group consisting of water dispersible and water soluble, over the top of the adhered continuous paper strips, and a third layer of adhesive composition comprising a hot melt adhesive composition over the top of the second layer of adhesive composition.

The inventors have found that the third layer of adhesive composition can act as a release layer making it possible to roll up the paper reinforced tape in a roll without need for a separate release layer. In this embodiment, during repulping the second layer dissolves or disperses making it easy to separate and remove the hot melt adhesive composition from the repulping slurry. The clean release of the hot melt adhesive composition also increases the fiber accepts from the paper reinforced tape components available to make new paper. The hot melt adhesive composition can be non-tacky and water insoluble.

Although the second layer can be an adhesive composition, it could alternatively be a coating, a preformed layer, or any other layer that would dissolve or disperse in the repulping slurry to enable the hot melt adhesive to release cleanly from the other tape components.

In a simpler embodiment, the paper reinforced tape can include a continuous paper strip, a continuous paper backing layer, and a first layer of adhesive composition disposed between the continuous paper strip on the first side of the continuous paper backing layer, thereby adhering the continuous paper strip to the continuous paper backing layer, the first layer of adhesive composition being selected from the group consisting of water dispersible and water soluble. The paper reinforced tape can further include a second layer of an adhesive composition comprising a hot melt adhesive composition over the top of the adhered continuous paper strip and optionally a third layer of an adhesive composition comprising a hot melt adhesive composition disposed on the second side (or back side) of the continuous paper backing layer. Alternatively, the second side (or back side) of the continuous paper backing layer can be pre-coated with a release material.

The paper reinforced tape can vary in width. It can be as wide as the web on which it is coated. The paper reinforced tape can then be cut into smaller widths. It can be from 0.5 mm to 3700 mm, from 2 mm to 500 mm, from 2 mm to 100 mm wide, or even from 2 mm to 25 mm wide.

The paper reinforced tape can be 1 mm to 50 mm wide, 2 mm to 30 mm wide, or even from 8 mm to 25 mm wide. The paper reinforced tape can be 2 mils to 50 mils thick, 5 mils to 30 mils thick, or even 5 mils to 20 mils thick.

Continuous Paper Backing Layer

The paper reinforced tape includes a continuous paper backing layer to which the continuous paper strip is adhered to. The continuous paper backing layer is repulpable, recyclable and is naturally sourced.

The continuous paper backing layer can have a basis weight different from the continuous paper strip. The continuous paper backing layer can have a basis weight less than that of the continuous paper strip.

The paper used for the continuous paper backing layer is not particularly limited. The paper can include cellulose (e.g. wood, cotton, bamboo, jute, hemp, thistle, linen, abaca, etc.), vegetables, other naturally derived materials or a combination thereof. The paper can be a white (i.e. bleached) or brown Kraft paper.

The paper can further include other materials such as e.g. fillers (e.g. calcium carbonate, clay, etc.), wet strength resins (e.g. urea-formaldehyde, melamine-formaldehyde, polyamide-epichlorohydrin) and dry strength resins (e.g. starches, natural gums (guar, locast bean, etc.), cationic polyacrylamides, etc.)

Suitable papers for the continuous paper backing layer include those having a basis weight of from about 25 grams per square meter (gsm) (about 16 #paper), 40, or 60 gsm, to about 100, 150, or about 300 gsm, or a weight between any pair of the foregoing values. In a preferred embodiment, the backing layer has a basis weight of from 25 gsm to 100 gsm.

Suitable continuous paper backing layers include a 35 #(about 57 gsm) natural brown paper, such as that commercially available from Pac Paper, Inc. (located in Vancouver, WA, USA).

Optional Continuous Fibrous Substrate

The reinforcement elements and paper reinforced tapes can be free of a continuous fibrous substrate such as e.g. string, yarn, etc. Optionally, the reinforcement elements and paper reinforced tapes can include a limited amount of a continuous fibrous substrate. In one embodiment, the continuous fibrous substrate is naturally sourced.

Illustrative fiber materials include continuous filaments (e.g., a monofilament or multifilament), spun yarn, zero-twist yarn, core spun yarn, and combinations thereof. The fiber can be made from a variety of natural fiber materials. Illustrative fiber materials include those that will maintain adequate tensile strength for the application. For example, the fiber materials may have a tensile strength of at least 50 grams per denier, greater than 100 grams per denier, from 50 to 2000 grams per denier, or even from 50 to 500 grams per denier.

Suitable fiber materials include those that are water-soluble or water-dispersible at a temperature of from about 10° C. to about 70° C., more particularly about 16° C. to about 55° C. Suitable fiber materials also include those that can disintegrate in an aqueous alkali environment, or alternatively in a non-alkali aqueous environment, at a temperature between 10° C. to about 70° C., more particularly about 16° C. to about 55° C.

In one embodiment, the fibers do not completely dissolve during repulping but instead disintegrate into shorter fiber lengths or disperse into solid particles. In this embodiment, the shorter fiber lengths or solid particles optionally are not removed during the repulping process and become a component of the finished paper product. Suitable fiber materials also include those that are compostable and/or biodegradable.

The reinforcement element or paper reinforced tape can comprise from 1 to 50, 1 to 20, 1 to 10, or even 2 to 8 strands of the continuous fibrous substrate.

Figure 3:
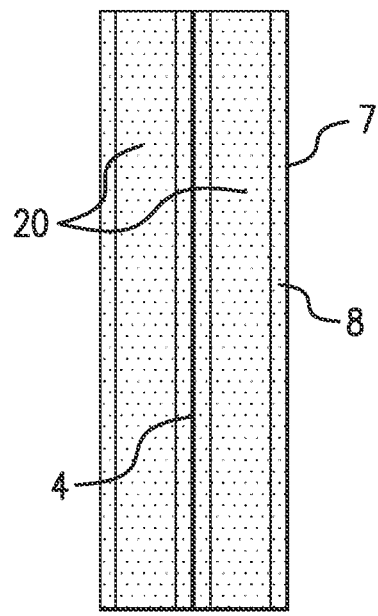
FIG. 3 is a top view of a paper reinforced tape of the invention including two separate continuous paper strips and one strand of a continuous fibrous substrate.
Figure 4:
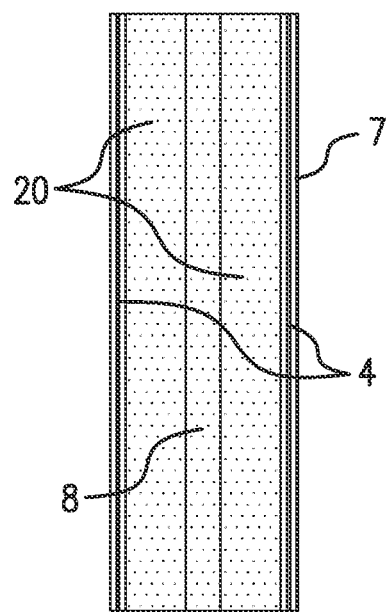
FIG. 4 is a top view of a paper reinforced tape of the invention including two separate continuous paper strips and two strands of a continuous fibrous substrate.

FIGS. 3-4 show paper reinforced tapes where strands of continuous fibrous substrate are used.

FIG. 3 is a paper reinforced tape (7) including two continuous paper strips (20) and 1 strand of continuous fibrous substrate (4) on a continuous paper backing layer (8).

FIG. 4 is a similar paper reinforced tape including 2 strands (4) of continuous fibrous substrate.

Examples of fiber materials include plastics such as polyester (for example polyethylene terephthalate (PET), polybutylene terephthalate (PBT), liquid crystalline polymers), polyamide (for example nylon, the synthetic fiber available under the trade designation KEVLAR) and combinations thereof.

Examples of naturally sourced fiber materials include rayon, polyvinyl alcohol, cotton, bamboo, lyocell, ramie, linen, hemp, wool, silk, jute, soybean protein fiber, cellulose acetate, and combinations or mixtures thereof.

Optional Non-Paper Continuous Strip

The reinforcement elements and paper reinforced tapes can include optional non-paper continuous strips. The non-paper continuous strips can comprise sustainable materials (e.g. PLA, PHA, polycaprolactone, etc.).

Optional Design Elements

The reinforcement elements and paper reinforced tapes can include additional design elements selected from the group consisting of perforation (i.e. intermittent small holes made by piercing or boring), slitting, folding and combinations thereof. These design elements can be used to help direct the forces acting on the reinforcement element or paper reinforced tape to preferred locations. The perforation and slitting can extend partially or fully through the element or paper reinforced tape.

The perforations can be cut mechanically, by use of a laser, or with any other suitable means. The perforations can run parallel to the length of the element or paper reinforced tape.

FIGS. 5-9 show examples of embodiments where perforation (12) is used. Perforation is represented by the bold dashed line.

Figure 5:
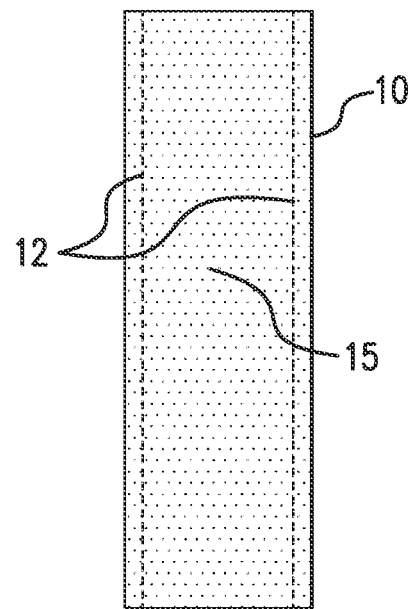
FIG. 5-7 are top views of reinforcement elements including various levels of perforation.
Figure 6:
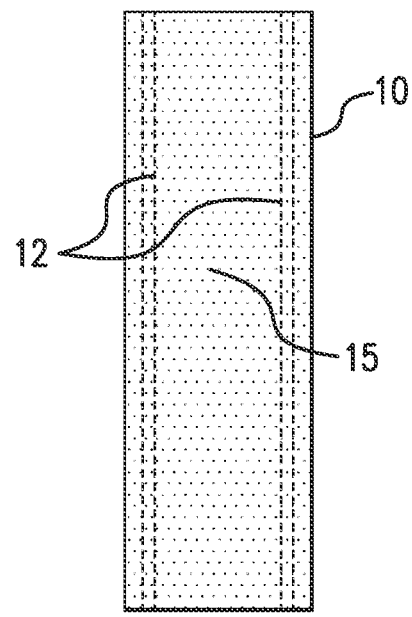
Figure 7:
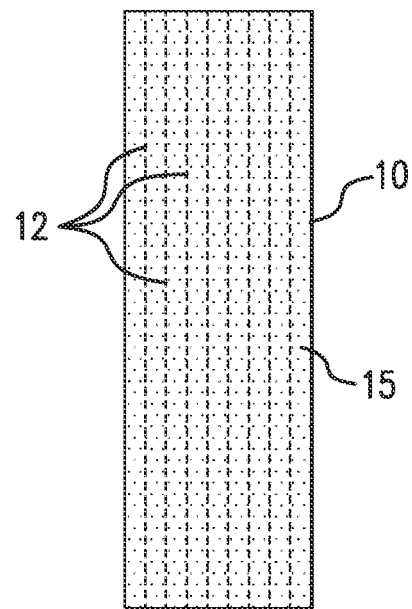

FIGS. 5-7 are reinforcement elements (10) including an adhesive composition (15, represented by dot pattern) and various perforation patterns (12).

Figure 8:
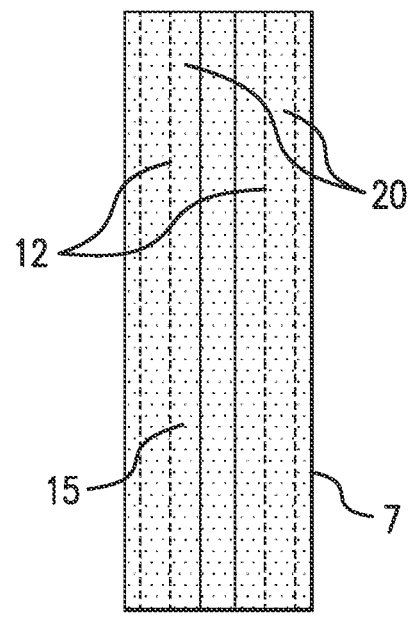
FIG. 8-9 are top views of paper reinforced tapes including two separate continuous paper strips and various levels of perforation.
Figure 9:
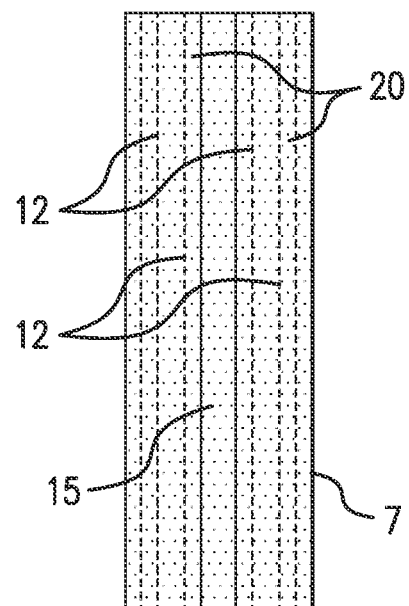
Figure 10:
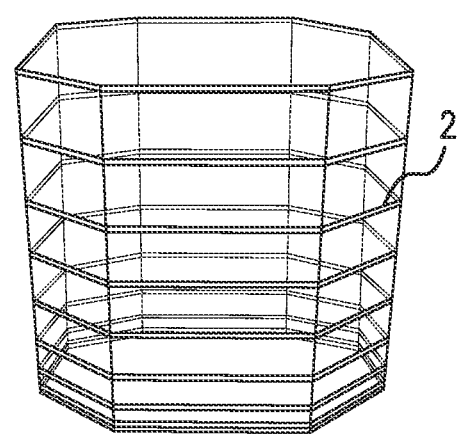
FIG. 10-15 are perspective views of some possible uses for the reinforcement elements and paper reinforced tapes of this invention in containers.
Figure 11:
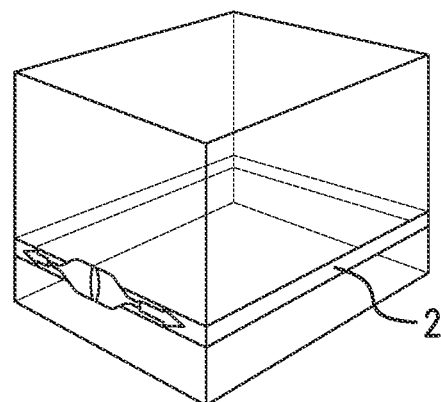
Figure 12:
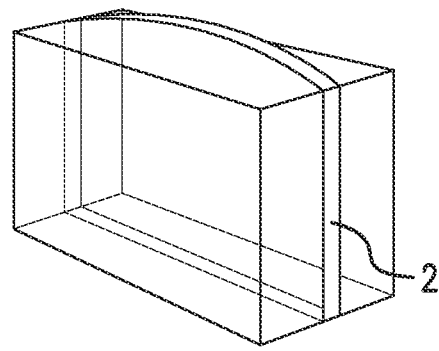
Figure 13:
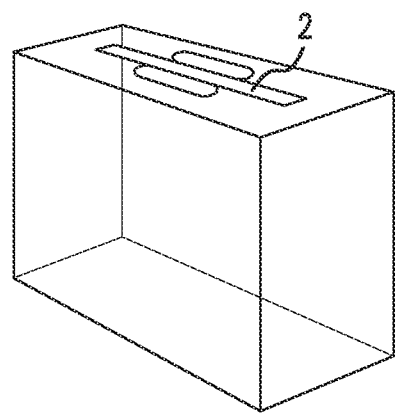
Figure 14:
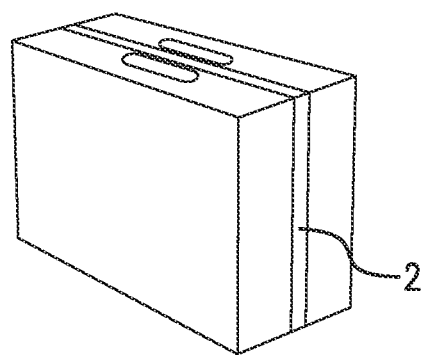
Figure 15:
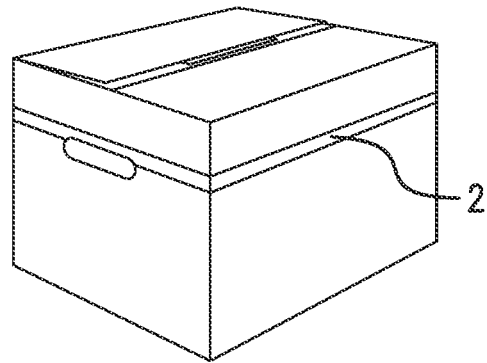

FIGS. 8-9 are paper reinforced tapes (7) including two continuous paper strips (20), adhesive composition (15) and various perforation patterns (12).

The reinforcement element or paper reinforced tape can also include coatings or preformed layers in various locations. In one embodiment, additional coatings or preformed layers can be located on the side opposite the adhesive composition or the continuous paper strip to provide various properties such as e.g., release, barrier, strength, etc.

Useful coating materials include but are not limited to soy wax, vegetable wax, poly lactic acid based polymers, protein adhesive composition, starch-based materials, etc. One specific material that has been found useful in this regard is NAT 155, a hydrogenated soy wax available from Marcus Oil and Chemical (Houston, Texas).

The continuous paper strip and the backing layer can also be coated or alternatively completely saturated with various materials to improve their properties. Materials that have been found useful in this regard include but are not limited to colloidal silica, cellulose nano crystals, polylactides, polyhydroxy butyrate, mineral fibers, etc.

Useful grades of colloidal silica are available under the LUDOX trade designations including e.g. LUDOX SM, LUDOX™-50, LUDOX CL-P and LUDOX CL-X, available from Grace (Columbia, MD).

Uses

The reinforcement elements and paper reinforced tapes of this invention are used in the construction of containers. They can be used as a carrying handle, a reinforcing tape, a closing tape, and an opening tape (e.g. tear tape).

Figure 16:
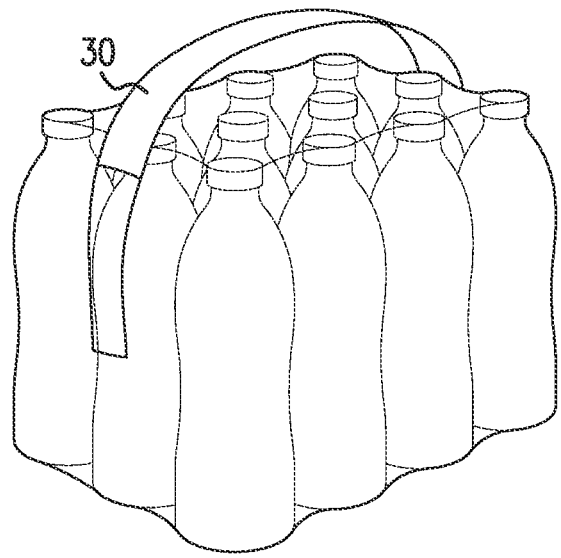
FIG. 16 is a perspective view of a carrying handle that could be constructed from the reinforcement elements and paper reinforced tapes of this invention.

The reinforcement elements and paper reinforced tapes of this invention can be used in any type of carrying handle including a handle for containers bundled in any manner e.g. paper board container, glued, shrink-wrapped, etc. FIG. 16 shows such a handle. In FIG. 16, the handle (30) is for containers bundled with shrink wrap.

Reinforcement elements and paper reinforced tapes can be applied to a container to reinforce stress points in the container (e.g. a formed or finished carton or case, box, envelope, bag, shrink wrapped pack, etc.) produced or formed from the substrate. The substrate can have one layer, two layers or more layers.

The substrate can be selected from the group consisting of paper, paper board, non-paper (e.g. plastics and plastic films (e.g. polyethylene (e.g. Tyvek®), polypropylene, etc.). If the substrate is a paper board substrate, it can be corrugated or non-corrugated. The paper board substrate can have a thickness of at least about 0.0825 mm (0.00310 in) and can be made of fibrous materials e.g. wood pulp, straw, paper, etc. or a combination thereof.

In one embodiment, the reinforcement elements or paper reinforced tapes of this invention can be applied to a paper board substrate during the process of making corrugated board by using the adhesive (e.g. starch, dextrin, etc.) that is used to form the flutes in the board.

A reinforcing tape comprising the reinforcement elements or paper reinforced tapes of this invention, may be located within layers of a multilayer container and/or it may be located on an exterior surface of the container (such as the outside surface of the inside of the carton or box).

Container stress points that are typically reinforced are those that have weak points or areas subject to stress that occurs in container handling or filling. Examples of specific stress points include hand holes, access holes, handles, basiloid lifting areas, scorelines (e.g., corner or horizontal scorelines), and similar areas that are subject to tears or structural failure (which may lead to container stack collapse). Moreover, reinforcing tape may be added during the board manufacturing process.

FIGS. 10-15 show examples of possible areas for reinforcement in a container. The reinforcement element or paper reinforced tape is represented by (2).

Substrates to which the reinforcement element or paper reinforced tape can be applied to include paper, non-paper (e.g. Tyvek®), paper board and may include, for example, films, additives, coatings, non-woven or woven webs, paper products, non-corrugated paper board, folding carton blanks, box board, corrugated paper board and other sheet materials and web materials, all of various widths. One or more substrates can form a construct e.g. a packaging container. Examples of packaging containers include cartons and boxes, such as cartons for holding beverages for sale (e.g. at the retail level (for instance, a paperboard carrier that holds six, 12 or 24 bottles or cans of a beverage), meat and produce bulk bins, wet-packed containers, reusable containers, rubber and chemical bulk bins, and heavy duty containers. In paperboard carriers, such as those used for beverages, the reinforcing tape is typically located adjacent to the hand hole.

Tape opening systems can also provide reinforcement of a container substrate while facilitating effective opening of the container. In tape opening systems, the reinforcement typically includes at least two reinforcement tapes—a reinforcing tear tape and reinforcing tear guide tape. Examples of tape opening systems are disclosed in U.S. Pat. Nos. 5,098,757, 5,135,790 and 4,773,541, all of which are incorporated herein by reference.

Any apparatus or system may be used to apply the composite to a substrate. A typical system is a Tape Dispenser Model V and Universal Beam tape applicator commercially available from Adhesive Coated Solutions (ACS), An H. B. Fuller Company, of Vancouver, Washington.

Repulping

During the repulping process the paper board waste including the reinforcement elements and/or the paper reinforced tape is introduced into a repulping tank. Water, steam, and optionally chemical additives are also introduced into the repulping tank to form a repulping slurry or repulping liquor. Repulping conditions vary from mill to mill. Some are done with ambient temperature and others are run hot at about 52° C. Some mills use no chemicals while others use chemicals such as sodium hydroxide to help speed the repulping.

The inventive reinforcement elements and paper reinforced tapes provide better performance and end of life in both recycling scenarios.

Some or all of the fiber can be free to move through the screens and filters of the repulping process and become part of the paper. The hot melt adhesive composition can be separated by the screens and in the OCC reverse cleaners and proceeds to a landfill or incinerator to produce energy. In the post-industrial process, some or all of the fiber is freed from the adhesive and moves through with the pulp. The hot melt adhesive composition may float to the surface to allow separation by skimming, may be caught in the screens due to the size of the hot melt fragments or be removed by cleaners.

In a preferred embodiment, the adhesive (e.g. protein adhesive composition or water sensitive hot melt) can solubilize in the repulping slurry and does not require removal.

Once the materials are separated in the repulper (in the OCC or post industrial recycling plant), any remaining continuous fibers are weaker individually than they are en masse or in the total paper reinforced tape form and may break into shorter segments when acted upon by the shear stresses in the repulper. The shorter fibers can pass through coarse and fine screening and then the forward and reverse cleaners into the pulp slurry that will be made into paper.

EXAMPLES

Preparation of the Examples 1-17

The paper reinforced tapes in Ex 3-Ex 13 and Ex 16 were made in a similar manner using the materials as listed in Table One.

The hot melt adhesive composition BL22515 (H. B. Fuller, Vancouver, WA) (or 80-80 for Ex 16) was added to a can and melted in an oven at 177° C. After melting, 25.4 microns (1 mil) of adhesive was coated directly onto the white 18.1 kg (40 lb) or brown 15.9 kg (35 lb) paper backing layer using a drawdown bar. The desired paper reinforced tape width (e.g., 19 mm) was measured on the paper and adhesive before placing the paper reinforcement strips.

For a 19 mm paper reinforced tape with two 7 mm paper strips, the strips were placed 1 mm inside each edge of the tape. Release paper was then placed over the tape and the paper strips were heated for 3 seconds with a hot iron at 130° C. to attach the strips to the backing layer.

Next, 50.8 microns (2 mils) of BL22515 (or 80-80) was coated on silicone release paper using a drawdown bar. The 50.8 micron (2 mil) layer of adhesive was then placed over the reinforcement strips and backing layer followed by release paper. The hot iron set at 130° C. was applied for 3 seconds over the release paper to laminate the second adhesive layer to the paper strips and paper backing layer. The paper strip reinforced tapes were cut to 25.4 cm (10 in) length and desired width. The paper reinforced tapes were later bonded to carton substrates with the hot iron at 130° C. for 3 seconds to provide handle reinforcement for drop tests.

For Ex. 17, the 80-80 was applied as described above in two layers first to the specified backing layer and second over the top of the continuous paper strips. The BL22515 was then applied as described above as a third layer over the top of the second layer of 80-80.

For the examples with additional fiber reinforcement, the fiber ends were added to the backing layer at the same time as the paper strips before adding the second adhesive layer for lamination. The 1 end of 1650d rayon fiber in Ex 11 (FIG. 3) was centered between the two paper strips directly attached to the backing layer. The 2 ends of 120d rayon fiber in Ex 12 (FIG. 4) were aligned between the edge of the paper reinforced tape and paper strip on each edge.

Ex 1, 2, 14 and 15 describe the use of a reinforcement element without the paper backing layer. For Ex 1, 14, and 15, 76.2 microns (3 mils) of BL22515 was applied to one side. For, Ex 2 the BL22515 was applied at 38.1 microns (1.5 mils) to each side for a total of 76.2 microns (3 mils).

Ex 13 uses colloidal silica on the side opposite of the reinforcement elements to enhance performance of the paper and paper reinforced tape. The colloidal silica (LUDOX SM) was applied at 25.4 microns (1 mil) using a drawdown bar before bonding the paper reinforced tape to cartons for testing.

The examples with perforation longitudinal to the paper reinforced tape were prepared using a ruler and placing perforations with a large pounce wheel (Excel Blades, Paterson, NJ). The large wheel has a 6.4 mm (0.438-inch) pounce wheel to create 14 perforations per inch. For Ex 14 (on Mondi 160 paper alone), perforations were placed 1 mm from the edge of the 19 mm paper reinforced tape for 2 perforations. For Ex 15 (on Mondi 160 paper alone), the 4 perforations on the edges were placed 1 mm and 2 mm from the edge on each side.

Ex 18—EN2004—a pre-coated tape was made (EN2003) by immerse coating a 2200d rayon yarn in a 230 F MP hotmelt (NT23007) to add 0.35 g/m of adhesive to the fiber and bundle was flattened, cooled and wound. The precursor tape (EN2003) was then adhere to 40 #white kraft paper web alternating spacing 13 mm and 4 mm apart. The precursor tape was between the gravure print wheel and the paper as the 180 F hotmelt (BL18007) was applied. The web was then nipped, cooled, slit to 19 mm widths, and traverse wound on 3.25" cores.

Ex 19—XP26127A—Roll of Mondi 160 paper unwound and pre-heated to 106 F. Slot coated with NT23007 and then joined with preheated 40 #paper (120 F). Laminated structure then passed through a nip and was chilled to cool the hotmelt. Second side gravure coated with the 180 F melt point EVA hotmelt (BL18007) and chilled. Web then slit to 19 mm widths and traverse wound on 3.25" diameter cores. Line speed was between 80-100 fpm.

Ex 20—XP28776N—Roll of Mondi 160 paper unwound and pre-heated to 106 F. Slot coated with NT23007 and then joined with preheated 35 #paper (120 F). Laminated structure then gravure coated on one side with a 180 F melt point EVA hotmelt (BL22515), passed through a nip, and then chilled to cool the hotmelt. Second side gravure coated with the 180 F melt point EVA hotmelt (BL22515) and chilled. Web then slit to 12.5 mm widths and traverse wound on 3.25" diameter cores. Line speed was between 80-100 fpm.

Ex 22—XP287760—Roll of Mondi 160 paper unwound and pre-heated to 106 F. Gravure coated on one side with a 225 F melt point EVA hotmelt (BL22515) and then chilled to cool hotmelt. Second side was gravure coated with same hotmelt and then web was chilled. Web then slit to 15 mm widths and traverse wound on 3.25" diameter cores. Line speed was between 80-100 fpm.

Ex 21—XP28776G—Roll of Mondi 160 paper unwound and pre-heated to 106 F. Slot coated with NT23007 and then joined with preheated 35 #paper (120 F). Laminated structure then gravure coated on one side with a 180 F melt point EVA hotmelt (BL18014), passed through a nip, and then chilled to cool the hotmelt. Second side gravure coated with the 180 F melt point EVA hotmelt (BL18014) and chilled. Web then slit to 12.5 mm widths and traverse wound on 3.25" diameter cores. Line speed was between 80-100 fpm.

Ex 22—XP287760—Roll of Mondi 160 paper unwound and pre-heated to 106 F. Gravure coated on one side with a 225 F melt point EVA hotmelt (BL22515) and then chilled to cool hotmelt. Second side was gravure coated with same hotmelt and then web was chilled. Web then slit to 15 mm widths and traverse wound on 3.25" diameter cores. Line speed was between 80-100 fpm.

Ex 23—XP28776L—Roll of Mondi 160 paper unwound and pre-heated to 106 F. Gravure coated on one side with a 180 F melt point EVA hotmelt (BL18014) and then chilled to cool hotmelt. Web then slit to 15 mm widths and traverse wound on 3.25" diameter cores. Line speed was between 80-100 fpm.

Ex 24—XP28776P—Roll of Mondi 160 paper unwound and pre-heated to 106 F. Gravure coated on one side with a 225 F melt point EVA hotmelt (BL22515) and then chilled to cool hotmelt. Second side was gravure coated with same hotmelt and then web was chilled. Web then slit to 19 mm widths and traverse wound on 3.25" diameter cores. Line speed was between 80-100 fpm.

Ex 25—XP28776M—Roll of Mondi 160 paper unwound and pre-heated to 106 F. Gravure coated on one side with a 180 F melt point EVA hotmelt (BL18014) and then chilled to cool hotmelt. Web then slit to 19 mm widths and traverse wound on 3.25" diameter cores. Line speed was between 80-100 fpm.

Tensile and Elongation

Tensile and Elongation were tested according to the ASTM D638 method using a Instron testing machine at a speed of 30.5 cm (12 inches (in))/minute. Samples in the tables were 10.2 cm (4 in) in length and samples in Tables 4-6 were 25.4 cm (10 in) in length. The width of the samples ranged from 12.5 mm to 19 mm for the paper reinforced tapes and the width of the continuous paper strip/s on the samples without a backing layer. Samples in Table 1 were 10.2 cm (4 in) in length and samples in Tables 4-6 were 25.4 cm (10 in) in length.

Portable Drop Test Method

The drop test was performed with 24-pack or 30-pack of 12-ounce, filled aluminum cans encased in a commercially available non-corrugated paperboard carton at 22° C. and 52% relative humidity (ambient), 5° C. and 85% relative humidity (refrigerated), and 32° C. and 90% relative humidity (tropical). The cases were conditioned for 48 hours at each temp/humidity before testing. The test measured the number of drops the integral handle of the 24-pack or 30-pack survived prior to failing. The reinforcement element or paper reinforced tape tested was applied to the side of the handle facing inward. The test was repeated 4 times for each reinforcement configuration.

The portable drop tester has a handle support that can be positioned and held while the case is loaded. When released, the handle supports falls 3.18 cm (1.25 in for 24-packs) or 5.08 cm (2.00 in for 30-packs) until caught by a metal stop. The handle has a dense foam layer to mimic padding on the human hand.

Method

1. Raise drop tester arm and secure.
2. Load package on handle
3. Release arm
4. Repeat 1-3 until the integral handle or the pack fails
5. Record number of successful drops recorded along with mode of failure Lab Repulpability Test 1.) Measure out 30 in of the reinforcement element or tape
2.) Cut into 4 inch segments
3.) Place segments in 230 milliliters (ml) of water at around 52° C.
4.) Blend in standard 1 gallon Waring blender on low speed (15,000 rpm) for 4 minutes
5.) Note the level of wrapping around the blade
6.) Rinse all fibers from the blender with 370 ml of hot water
7.) Deflake for 5 minutes in a British Disintegrater at 3000 RPM
8.) Drain over a 0.254 mm (0.010 inch) screen
9.) Assign a Relative Repulping Score on a scale of 0-5 per the following 0—All tape components wrap around the blades and do not release from paper fiber in the screen. No breakdown of tape substrate components is observed.
1—Significant tape and tape components wrap around the blades and do not release from paper fiber in the screen. Little breakdown of tape substrate components is observed.
2—Limited tape and tape components wrap around the blades and do not fully release from paper fiber in the screen. Minimal breakdown of tape substrate components is observed.
3—Tape and tape components have minimal wrapping of the blades and do not fully release from paper fiber in screen. Additional breakdown of tape substrate components is observed.
4—Tape and tape components do not wrap around the blades and paper fiber mostly releases in the screen. Significant breakdown of tape substrate components is observed.
5—Tape and tape components do not wrap around the blades and paper fiber fully releases in the screen. Complete breakdown of tape substrate components is observed.

Fibre Box Association Test Part I and Modified Fibre Box Association Test Part II Testing was performed using the Voluntary Standard for Repulping and Recycling Corrugated Fiberboard Treated to Improve Its Performance in the Presence of Water and Water Vapor (Revised Aug. 16, 2013) with modifications noted below. Testing was performed at Western Michigan University in their Paper Pilot Plant.

Note: Repulpability testing was performed according to Part I. Recyclability testing was performed by a modified version of Part II using fiber accepts from the Part I test to make handsheets. The handsheets were then tested using the test methods from Part II including basis weight, slide angle, short span compression, burst strength, water drop penetration and stickies. This is thought to be a worst-case scenario as no additional effort was made to separate adhesive components (generally done in the Part II pilot scale test).

2—Handle Side Handhold Drop Testing

This test is to evaluate hand hole performance for a 32B mottled white regular slotted container (RSC) box with or without reinforcement tape. The tape is ironed on at 130° C. directly above the handle for the full length of box. Each box is subject to drops until failure. Amplitude for the box drop is 1.5". The materials used include an A-frame structure, j-hooks, L-brackets, carabiners, chains, and an adjustable drop tester. The box is placed on the drop tester platform and j-hooks inserted in hand holes. The box is then dropped. Repeat until there is box failure. Content in the box is 35 pounds of resin pellets filled to 80-95% of the box volume. Prior to drop testing, the boxes are pre-conditioned in the environmental chamber at 38° C. and 30% relative humidity for 24 hours before 48-hr conditioning at the selected test conditions before testing. The conditions include ambient (23° C. and 50% relative humidity), refrigerated (5° C. and 85% relative humidity), and tropical (40° C. and 90% relative humidity). Eight replicates are tested for each tape condition at ambient and four replicates for each tape condition at refrigerated and tropical.

Jerk Testing

This test is to evaluate sling handle performance for a 32B mottled white milk box design with or without reinforcement tape. The tape is ironed to the handle at 130° C. Each box is subject to jerk drops until failure using H. B. Fuller's jerk test apparatus and a j hook. Amplitude for the box drop is 1.0". Content in the box is 6 cartons of 32-ounce Dream oat milk beverage. Prior to drop testing, the boxes are pre-conditioned in the environmental chamber at 38° C. and 30% relative humidity for 24 hours before 48-hr conditioning at the selected test conditions before testing. The conditions include ambient (23° C. and 50% relative humidity), refrigerated (5° C. and 85% relative humidity), and tropical (40° C. and 90% relative humidity). Twelve replicates are tested for each tape condition at ambient and four replicates for each tape condition at refrigerated and tropical.

Box Opening Test

This test is to evaluate the opening performance for tapes ironed onto full length 32B mottled white boxes at ambient condition. The boxes have two pull tabs to start the box opening process for each side. The tape is ironed on at 130° C. consistent with the tab locations for the full length of box. The boxes are filled with approximately 15 pounds of resin pellets to 80-95% of the box volume. The boxes are opened with the tapes by twelve different individuals for each tape with no instruction on how to tear the box. The ability of the tape to open the box without tape failure was evaluated to provide the overall PASS or FAIL rating. The box condition with no tape failed the test.

Materials Used in Tables

Paper Backing

Brown—57 gsm Kraft paper from Pac Paper, Inc
White—65 gsm bleached Kraft paper from Pac Paper, Inc Adhesive BL22515—Blue colored, Ethylene vinyl-acetate based hot melt adhesive composition (soft point around 107.2° C.)
80-80—Protein adhesive composition Adhesive
NT23007—Natural colored, Ethylene vinyl-acetate based hot melt adhesive composition (soft point around 110° C.)
BL23007—Blue colored, Ethylene vinyl-acetate based hot melt adhesive composition (soft point around 110° C.)
BL18007—Blue colored, Ethylene vinyl-acetate based hot melt adhesive composition (soft point around 85° C.)
BL18014—Blue colored, Ethylene vinyl-acetate based hot melt adhesive composition (soft point around 79.4° C.)
Note: Softening point testing performed using a Mettler apparatus Reinforcement Elements MONDI 160—ADVANTAGE MF SPRING PACK PLUS 160
MONDI 70—ADVANTAGE MF SPRING PACK PLUS 70
FIBRE FORM 80—white 3d paper in basis weight of 80 gsm
FIBRE FORM 200—white 3d paper in basis weights of 200 gsm Coating Material LUDOX SM, colloidal silica available from Grace (Columbia, MD)
NAT 155, hydrogenated soy wax available from Marcus Oil & Chemical (Houston, Texas).

TABLE 1

Reinforcement Elements (RE) and Paper reinforced tapes (19 mm wide)

For paper reinforced tapes (i.e. with backing layer): First listed thickness refers to adhesive between backing layer and continuous paper strip/Second listed thickness refers to adhesive over the top of backing layer and continuous paper strip/Third listed thickness refers to adhesive layer on opposite side of the tape.
* In Ex. 17, the third listed adhesive thickness refers to an adhesive layer over the top of the second adhesive layer.
For Reinforcement Elements (i.e. no backing layer): First listed thickness refers to adhesive layer on the first side of the continuous paper strip/Second listed thickness refers to layer of adhesive on the second side of continuous paper strip.

| | Backing Layer | Adhesive | Continous paper strip | Tensile (lbs) | Elongation (%) | Drop Test (24 can pack) (# of drops) | Ave. # Drops | Relative Repulping Score |
|---|---|---|---|---|---|---|---|---|
| Handle with no RE/Tape | | | | | | 0, 0, 0, 0 | 0 | |
| Control 1 Commercial plastic backed tape | | | | 107.8 | 20.1 | 1, 2, 1, 2 | 1.5 | 0 |
| Control 2 Commercial PET fiber reinforced paper backed tape | | | | 143.9 | 10.7 | 2, 2, 2, 2 | 2 | 0 |
| Ex 1 | None | BL22515 3 mil | MONDI 160 (19 mm wide) | 83.55 | 9.8 | 2, 1, 4, 2 | 2.25 | |
| Ex 2 | None | BL22515 1.5/1.5 mil | MONDI 160 (2 × 7 mm strips) | 56.9 | 9.9 | 2, 8, 1, 3 | 3.5 | |
| Ex 3 | Brown | BL22515 1.5/2.0 mil | MONDI 160 (19 mm wide) | 92.2 | 8.8 | 1, 3, 3, 3 | 2.5 | |
| Ex 4 | White | BL22515 1/1.5/0.5 mil | MONDI 160 (2 × 7 mm strips) | 59.41 | 6.3 | 4, 2, 3, 5 | 3.5 | 5 |

TABLE 1-continued

Reinforcement Elements (RE) and Paper reinforced tapes (19 mm wide)

For paper reinforced tapes (i.e. with backing layer): First listed thickness refers to adhesive between backing layer and continuous paper strip/Second listed thickness refers to adhesive over the top of backing layer and continuous paper strip/Third listed thickness refers to adhesive layer on opposite side of the tape.
* In Ex. 17, the third listed adhesive thickness refers to an adhesive layer over the top of the second adhesive layer.
For Reinforcement Elements (i.e. no backing layer): First listed thickness refers to adhesive layer on the first side of the continuous paper strip/Second listed thickness refers to layer of adhesive on the second side of continuous paper strip.

|  | Backing Layer | Adhesive | Continous paper strip | Tensile (lbs) | Elongation (%) | Drop Test (24 can pack) (# of drops) | Ave. # Drops | Relative Repulping Score |
|---|---|---|---|---|---|---|---|---|
| Ex 5 | Brown | BL22515 1/1.5/0.5 mil | MONDI 160 (2 × 7 mm strips) | 57.71 | 6.6 | 3, 4, 1, 1 | 2.25 | 5 |
| Ex 6 | White | BL22515 1/2 mil | MONDI 160 (2 × 7 mm strips) | 59.69 | 6.5 | 4, 4, 25, 2 | 8.75 | 5 |
| Ex 7 | Brown | BL22515 1/2 mil | MONDI 160 (2 × 7 mm strips) | 60.66 | 6.6 | 3, 4, 4, 3 | 3.5 | 5 |
| Ex 8 |  | BL22515 1/2 mil | MONDI 70 (2 × 7 mm strips) | 47.18 | 4.3 | 17, 1, 3, 0 | 5.25 |  |
| Ex 9 | Brown | BL22515 1/2 mil | BK 80 (2 × 7 mm strips) | 37.87 | 5.5 | 3, 3, 1, 2 | 2.25 |  |
| Ex 10 | Brown | BL22515 1/2 mil | BK 200 (2 × 7 mm strips) | 57.28 | 8.9 | 3, 1, 4, 3 | 2.75 |  |
| Ex 11 | Brown | BL22515 1/2 mil | MONDI 160 (2 × 7 mm strips) w/1end 1650d rayon centered | 80.2 | 6.3 | 3, 3, 6, 3 | 3.75 |  |
| Ex 12 | Brown | BL22515 1/2 mil | MONDI 160 (2 × 7 mm strips) w/1end 120d rayon each edge | 63.08 | 6.4 | 2, 6, 2, 5 | 3.75 |  |
| Ex 13 | Brown | BL22515 1/2 mil | MONDI 160 (2 × 7 mm strips) w/1 mil colloidal silica on strips | 56.94 | 10 | 2, 3, 3, 4 | 3 |  |
| Ex 14 | None | BL22515 3 mil | MONDI 160 1 perf each edge | 80.66 | 9.5 | 4, 2, 4, 2 | 3 |  |
| Ex 15 | None | BL22515 3 mil | MONDI 160 2 perf each edge | 78.71 | 9.3 | 9, 2, 2, 3 | 4 |  |
| Ex 16 | White | 80-80 1/2 mil/1 mil Nat155 opposite side | MONDI 160 (2 × 7 mm strips) | 50.06 | 4.4 | 4, 3, 1, 5 | 3.25 | 5 |
| Ex 17 | White | 80-80 1/1 mil/1 mil BL22515 * | MONDI 160 (1 × 19 mm strip) | 72.3 | 6 | 2, 1, 2, 3 | 2 | 5 |

TABLE 2

Fibre Box Association Test Part I and Modified Fibre Box Association Test Part II High Level Results (in this test, the tape is applied to the Kraft Liner control and added to the repulper at 2% by weight)

|  | Part I-Repulpability | Modified Part II-Recyclability |
|---|---|---|
| Kraft Liner Control | Pass | NA |
| Kraft Liner including 2% by weight of the Kraft Liner with Example 6 tape | Pass | Pass |
| Kraft Liner including 2% by weight of the Kraft Liner with Example 16 tape | Pass | Pass |

TABLE 3

Fibre Box Association Test Part I and Modified Fibre Box Association Test Part II
(in this test, the tape is applied to the Kraft Liner control and added to the repulper at 2% by weight)

| | Repulping Accepts, % | Repulping Rejects, % | Tape Basis Weight, lb/1000ft^2 | Slide Angle, degree | Water Drop Penetration, seconds | STFI (index) | Burst Strength (index) | Stickies (count) | Result |
|---|---|---|---|---|---|---|---|---|---|
| Kraft Liner Control | 99.85 | 0.15 | 30.17 | 30 | 0.795 | 0.259 | 1.46 | 0 | NA |
| Kraft Liner including 2% by weight of the Kraft Liner with Example 6 tape | 98.45 | 1.55 | 30.58 | 32 | 0.625 | 0.260 | 1.54 | 1 | PASS |
| Kraft Liner including 2% by weight of the Kraft Line with Example 16 tape | 100.0 | 0.00 | 30.84 | 30 | 2.255 | 0.292 | 1.67 | 0 | PASS |

Requirements for FBA Part II Recyclability Pass for Handsheet Testing from FBA Part I Repulpability Repulping Rejects <15%
Slide Angle TAPPI T-815 Mean of Sample greater than or equal to 0.85×Mean of Control
Water Drop Penetration TAPPI T-831 Mean of Sample less than or equal to Mean of Control+200
Short Span Compression (STFI) TAPPI T-826, indexed Mean STFI of sample no more than 10% lower than indexed Mean STFI of Control
Burst Strength TAPPI T-403, indexed Mean Burst of Sample no more than 10% lower than indexed Mean Burst of Control
Stickies spot appearance consistent with TAPPI T-537, -277, -563, Mean Spot Count of Sample less than or equal to 15, or, no more than 30% greater than Mean of Control.

For Tables 4-6 the Controls are as follows:
Control 1: 19 mm Commercial PP plastic backed tape
Control 2: 19 mm Commercial PET fiber reinforced paper backed tape
Control 3: 11 mm Commercial PET plastic fiber reinforced tape
Ambient conditions (22° C. and 52% relative humidity), Refrigerated conditions (5° C. and 85% relative humidity), and Tropical conditions (32° C. and 90% relative humidity)

TABLE 4

Ambient Testing Results

| | Backing Layer | Adhesive | Continuous paper strip or optional design element | Bio-Content (% based on g/m2) | Ambient Tensile Newtons (lbs) | Ambient Drop Test (Ave. # of drops) 30 pack | Ambient Jerk Test (Ave. # of drops) | Ambient 2-Handle Side Handhold Jerk Test (Ave. # of drops) | Ambient 32B Box Opening Test |
|---|---|---|---|---|---|---|---|---|---|
| No Tape | | | | | | 0.0 | 0.0 | 2.9 | FAIL |
| Control 1 | | | | 7% | 92.1 | 2.3 | | | |
| Control 2 | | | | 37% | 113.5 | 5.0 | | | |
| Control 3 | | | | 19% | 82.5 | | 100+ | 7.8 | PASS |
| Ex 18 EN2004 | White | NT23007 0.7 g/m on rayon yarn (precursor tape) BL18007 0.9 g/m coated on paper and precursor tape | 2 ends 2200d rayon, ~2 mm from each edge of tape | 58% | 46.5 | 2.3 | | | |
| Ex 19 XP26127A | White | BL23007 0.5 g/m for lamination NT18007 0.8 g/m on outer surface of Mondi 160 | MONDI 160 (19 mm wide) | 80% | 78.9 | 4.0 | | | |
| Ex 20 XP28776N | Brown | BL22515 0.5 g/m on outer surface BL23007 0.3 g/m for lamination BL22515 0.5 g/m on outer surface | MONDI 160 (12.5 mm wide) | 77% | 57.6 | | 100+ | | PASS |
| Ex 21 XP28776G | Brown | BL18014 0.5 g/m on outer surface BL23007 0.3 g/m for lamination BL18014 0.5 g/m on outer surface | MONDI 160 (12.5 mm wide) | 77% | 52.5 | | 90.9 | 9.3 | PASS |

TABLE 4-continued

Ambient Testing Results

| | Backing Layer | Adhesive | Continuous paper strip or optional design element | Bio-Content (% based on g/m2) | Ambient Tensile Newtons (lbs) | Ambient Drop Test (Ave. # of drops) 30 pack | Ambient Jerk Test (Ave. # of drops) | Ambient 2-Handle Side Handhold Jerk Test (Ave. # of drops) | Ambient 32B Box Opening Test |
|---|---|---|---|---|---|---|---|---|---|
| Ex 22 XP28776O | None | BL22515 0.6 g/m on both sides | MONDI 160 (15 mm wide) | 79% | 59.0 | | 100+ 83.2 | | PASS |
| Ex 23 XP28776L | None | BL18014 0.6 g/m on both sides | MONDI 160 (15 mm wide) | 81% | | | 83.2 | 4.4 | PASS |
| Ex 24 XP28776P | None | BL22515 0.8 g/m on both sides | MONDI 160 (19 mm wide) | 79% | 80.5 | 3.0 | 96.8 | | PASS |
| Ex 25 XP28776M | None | BL18014 0.8 g/m on both sides | MONDI 160 (19 mm wide) | 81% | | | 91.9 | 5.8 | PASS |

TABLE 5

Refrigerated Testing Results

| | Backing Layer | Adhesive | Continuous paper strip or optional design element | Refrigerated Tensile (lbs) | Refrigerated Drop Test (Ave. # of drops) | Refrigerated Jerk Test (Ave. # of drops) | Refrigerated 2-Handle Side Handhold Jerk Test (Ave. # of drops) |
|---|---|---|---|---|---|---|---|
| No Tape | | | | | 0.8 | 0.0 | 3.0 |
| Control 1 | | | | 86.5 | 5.3 | | |
| Control 2 | | | | 105.5 | 6.3 | | |
| Control 3 | | | | 89.7 | | 100+ | 6.8 |
| Ex 18 EN2004 | White | NT23007 0.7 g/m on rayon yarn (precursor tape) BL18007 0.9 g/m coated on paper and precursor tape | 2 ends 2200d rayon, ~2 mm from each edge of tape | 47.5 | 1.3 | | |
| Ex 19 XP26127A | White | BL23007 0.5 g/m for lamination NT18007 0.8 g/m on outer surface of Mondi 160 | MONDI 160 (19 mm wide) | 76 | 8.5 | | |
| Ex 20 XP28776N | Brown | BL22515 0.5 g/m on outer surface BL23007 0.3 g/m for lamination BL22515 0.5 g/m on outer surface | MONDI 160 (12.5 mm wide) | 54.8 | | 100+ | |
| Ex 21 XP28776G | Brown | BL 18014 0.5 g/m on outer surface BL23007 0.3 g/m for lamination BL 18014 0.5 g/m on outer surface | MONDI 160 (12.5 mm wide) | 57.6 | | 92.5 | 6.5 |
| Ex 22 XP28776O | None | BL22515 0.6 g/m on both sides | MONDI 160 (15 mm wide) | 56.8 | | 100+ | |
| Ex 23 XP28776L | None | BL18014 0.6 g/m on both sides | MONDI 160 (15 mm wide) | | | 88.0 | 5.0 |
| Ex 24 XP28776P | None | BL22515 0.8 g/m on both sides | MONDI 160 (19 mm wide) | 68.6 | 2.7 | 100+ | |
| Ex 25 XP28776M | None | BL18014 0.8 g/m on both sides | MONDI 160 (19 mm wide) | | | 100+ | 5.5 |

TABLE 6

Tropical Testing Results

| | Backing Layer | Adhesive | Continuous paper strip or optional design element | Tropical Tensile (lbs) | Tropical Drop Test (Ave. # of drops) | Tropical Jerk Test (Ave. # of drops) | Tropical 2-Handle Side Handhold Jerk Test (Ave. # of drops) |
|---|---|---|---|---|---|---|---|
| No Tape | | | | | 0.8 | 0.0 | 3.0 |
| Control 1 | | | | 69.8 | 5.0 | | |
| Control 2 | | | | 96.8 | 6.0 | | |
| Control 3 | | | | 81.5 | | 83.8 | 5.3 |
| Ex 18 EN2004 | White | NT23007 0.7 g/m on rayon yarn (precursor tape) BL18007 0.9 g/m coated on paper and precursor tape | 2 ends 2200d rayon, ~2 mm from each edge of tape | 37.9 | 2.3 | | |
| Ex 19 XP26127A | White | BL23007 0.5 g/m for lamination NT18007 0.8 g/m on outer surface of Mondi 160 | MONDI 160 (19 mm wide) | 73.1 | 4.8 | | |
| Ex 20 XP28776N | Brown | BL22515 0.5 g/m on outer surface BL23007 0.3 g/m for lamination BL22515 0.5 g/m on outer surface | MONDI 160 (12.5 mm wide) | 43.1 | | 100+ | |
| Ex 21 XP28776G | Brown | BL18014 0.5 g/m on outer surface BL23007 0.3 g/m for lamination BL18014 0.5 g/m on outer surface | MONDI 160 (12.5 mm wide) | 46.1 | | 73.3 | 5.5 |
| Ex 22 XP28776O | None | BL22515 0.6 g/m on both sides | MONDI 160 (15 mm wide) | 51.2 | | 91.8 | |
| Ex 23 XP28776L | None | BL18014 0.6 g/m on both sides | MONDI 160 (15 mm wide) | | | 74.8 | 5.5 |
| Ex 24 XP28776P | None | BL22515 0.8 g/m on both sides | MONDI 160 (19 mm wide) | 67.3 | 2.5 | 100+ | |
| Ex 25 XP28776M | None | BL18014 0.8 g/m on both sides | MONDI 160 (19 mm wide) | | | 99.3 | 5.3 |

What is claimed is:

1. A container comprising a reinforcement element, secured to a portion of the container, wherein the reinforcement element comprises:
   a continuous paper strip having a first and second side,
   a first layer of adhesive composition disposed on the first side, and
   from 1 to 10 strands of a continuous fibrous substrate, wherein the reinforcement element is secured to the container by the adhesive composition, the continuous paper strip having a basis weight of from 50 gsm to 300 gsm.

2. The container of claim 1 selected from the group consisting of:
   a. a first container comprising,
      i. a substrate having a first layer and a second layer; and
      ii. the reinforcement element secured to at least the first layer or the second layer such that the reinforcement element is located between the first layer and the second layer; and
   b. a second container comprising,
      i. a substrate having at least one exterior surface; and
      ii. the reinforcement element secured to at least one exterior surface of the substrate;
      wherein the reinforcement element is disposed on at least one of the first and second sides.

3. The container of claim 1 wherein the reinforcement element comprises from 3 to 8 strands of the continuous fibrous substrate.

4. The container of claim 1 wherein the continuous fibrous substrate is selected from the group consisting of monofilament, multifilament, spun yarn, zero-twist yarn, and core spun yarn.

5. The container of claim 1 wherein the continuous fibrous substrate is naturally sourced.

6. The container of claim 5 wherein the continuous fibrous substrate is selected from the group consisting of rayon, polyvinyl alcohol, cotton, bamboo, lyocell, ramie, linen, hemp, wool, silk, jute, soybean protein fiber, cellulose acetate, and combinations or mixtures thereof.

7. The container of claim 1 wherein the continuous fibrous substrate is selected from the group consisting of polyester, polyamide, and combinations thereof.

8. The container of claim 1 wherein the continuous fibrous substrate is a polyester monofilament.

9. The container of claim 1 wherein the substrate is selected from the group consisting of paper, paper board, and non-paper.

10. The container of claim 1 wherein the reinforcement element is free from plastic film derived from fossil fuel based materials and plastic string derived from fossil fuel based materials.

11. The container of claim 1 wherein the reinforcement element is completely naturally sourced.

12. The container of claim 1 wherein the continuous paper strip comprises paper having a basis weight of from 70 gsm to 200 gsm.

13. The container of claim 1 wherein the continuous paper strip has a width of from 1 mm to 50 mm.

14. The container of claim 1 wherein the adhesive composition is selected from the group consisting of hot melt adhesive composition and protein adhesive composition.

15. The container of claim 1 wherein the adhesive composition is selected from the group consisting of water soluble and water dispersible.

16. The container of claim 1 wherein the continuous paper strip comprises a second layer of material disposed on the second side.

17. The container of claim 16 wherein the second layer of material is selected from the group consisting of barrier material and release material.

18. The container of claim 1 wherein the reinforcement element further includes a design element selected from the group consisting of perforation, slitting, folding and combinations thereof.

19. A container comprising a reinforcement element, secured to a portion of the container, wherein the reinforcement element comprises:
- a continuous paper strip having a first and second side, and edges along the outer lengths of the continuous paper strip,
- a first layer of adhesive composition disposed on the first side, and
- from 1 to 20 strands of a continuous fibrous substrate disposed only along the edges of the continuous paper strip,
- wherein the reinforcement element is secured to the container by the adhesive composition and the continuous paper strip has a basis weight of from 50 gsm to 300 gsm.

20. The container of claim 1 wherein the continuous paper strip has a basis weight of 100 gsm to 300 gsm and the adhesive composition is a hot melt adhesive composition.

* * * * *